US011400959B2

(12) United States Patent
Fang et al.

(10) Patent No.: US 11,400,959 B2
(45) Date of Patent: Aug. 2, 2022

(54) METHOD AND SYSTEM TO PREDICT ONE OR MORE TRAJECTORIES OF A VEHICLE BASED ON CONTEXT SURROUNDING THE VEHICLE

(71) Applicant: Baidu USA LLC, Sunnyvale, CA (US)

(72) Inventors: Shiyuan Fang, Sunnyvale, CA (US); I-Hsuan Yang, Sunnyvale, CA (US); Jinghao Miao, Sunnyvale, CA (US); Liyun Li, Sunnyvale, CA (US); Liangliang Zhang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 316 days.

(21) Appl. No.: 16/296,177

(22) Filed: Mar. 7, 2019

(65) Prior Publication Data
US 2019/0204843 A1    Jul. 4, 2019

Related U.S. Application Data

(63) Continuation of application No. 15/387,466, filed on Dec. 21, 2016, now Pat. No. 10,268,200.

(51) Int. Cl.
*B60W 60/00* (2020.01)
*B60W 30/095* (2012.01)
(Continued)

(52) U.S. Cl.
CPC .... *B60W 60/0027* (2020.02); *B60W 30/0956* (2013.01); *B60W 50/0097* (2013.01);
(Continued)

(58) Field of Classification Search
CPC . B60W 60/0027–00276; B60W 30/08; B60W 30/09; B60W 30/095;
(Continued)

(56) References Cited

U.S. PATENT DOCUMENTS

| 9,248,834 B1 | 2/2016 | Ferguson et al. |
| 2010/0228427 A1 | 9/2010 | Anderson et al. |

(Continued)

FOREIGN PATENT DOCUMENTS

| DE | 102013005362 | 10/2013 |
| EP | 2562060 | 2/2013 |

(Continued)

OTHER PUBLICATIONS

Solver.com, Training an Artificial Neural Network—Intro, Accessed Jun. 30, 2016, FrontlineSolvers, https://www.solver.com/training-artificial-neural-network-intro (Year: 2016).*
Dodd, Will, "The Design of Procedural, Semantic, and Episodic Memory Systems for a Cognitive Robot," Aug. 2005, Vanderbilt University (Year: 2005).*
(Continued)

*Primary Examiner* — Spencer D Patton
(74) *Attorney, Agent, or Firm* — Womble Bond Dickinson (US) LLP

(57) ABSTRACT

A surrounding environment of an autonomous vehicle is perceived to identify one or more vehicles nearby. For each of the identified vehicles, based on a current location of the identified vehicle, vehicle-independent information is obtained to determine context surrounding the identified vehicle, where the vehicle-independent information includes vehicle surrounding information that defines physical constraints imposed on the identified vehicle. For each of the identified vehicles, one or more trajectories for the identified vehicle are predicted based at least in part on the vehicle-independent information associated with the identified
(Continued)

vehicle. The autonomous vehicle is controlled based on the one or more predicted trajectories of the one or more identified vehicles.

21 Claims, 9 Drawing Sheets

(51) Int. Cl.
  *G05D 1/02* (2020.01)
  *G08G 1/16* (2006.01)
  *B60W 50/00* (2006.01)
  *G05D 1/00* (2006.01)

(52) U.S. Cl.
  CPC .......... *G05D 1/0088* (2013.01); *G05D 1/0212* (2013.01); *G05D 1/0221* (2013.01); *G05D 1/0289* (2013.01); *G08G 1/166* (2013.01); *B60W 2050/0028* (2013.01); *B60W 2554/00* (2020.02); *G05D 2201/0213* (2013.01)

(58) Field of Classification Search
  CPC ............ B60W 30/0956; G05D 1/0212; G05D 1/0214; G05D 1/0221; G05D 1/0287; G05D 1/0289; G05D 1/0088; G05D 2201/0213; G05D 2201/0212; G08G 1/166
  See application file for complete search history.

(56) References Cited

U.S. PATENT DOCUMENTS

| | | |
|---|---|---|
| 2013/0060413 A1 | 3/2013 | Lee et al. |
| 2014/0067220 A1 | 3/2014 | Seiler et al. |
| 2014/0142799 A1 | 5/2014 | Ferguson ................ G05D 1/00 701/23 |
| 2015/0106010 A1* | 4/2015 | Martin ................ G08G 1/0129 701/410 |
| 2017/0008521 A1 | 1/2017 | Braunstein ............. G01C 21/32 |
| 2017/0187747 A1* | 6/2017 | Huston, III ......... H04L 63/1441 |

FOREIGN PATENT DOCUMENTS

| | | |
|---|---|---|
| EP | 2923911 | 9/2015 |
| JP | 2010-055403 | 3/2010 |
| JP | 2010-228740 | 10/2010 |
| JP | 2011-107068 | 6/2011 |
| JP | 2011-221667 | 11/2011 |
| JP | 2011-221698 | 11/2011 |
| JP | 2016-045636 | 4/2016 |
| KR | 10-2006-0044458 | 5/2006 |
| KR | 10-2014-0135828 | 11/2014 |

OTHER PUBLICATIONS

Ahmad et al., "Bayesian Intent Prediction in Object Tracking Using Bridging Distributions", Dec. 2, 2016, IEEE Transactions on Cybernetics (Year: 2016).

* cited by examiner

METHOD AND SYSTEM TO PREDICT ONE OR MORE TRAJECTORIES OF A VEHICLE BASED ON CONTEXT SURROUNDING THE VEHICLE

RELATED APPLICATION

The application is a continuation of U.S. patent application Ser. No. 15/387,466, filed Dec. 21, 2016, which is incorporated by reference herein in its entirety.

TECHNICAL FIELD

Embodiments of the present invention relate generally to operating autonomous vehicles. More particularly, embodiments of the invention relate to prediction of trajectories of a vehicle based on context surrounding the vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Similar to human beings making various decisions while driving, an autonomous vehicle always has to make instant driving decisions according to the actual surrounding environment, which may include certain driving conditions, surrounding obstacles, and traffic conditions. Such environment often influences movement of vehicles, and it may be difficult to determine or identify the next maneuver a vehicle will make in the environment. Human beings, however, can easily identify and resolve the difficulties, for example, by using the naked eyes. Unfortunately, such may be challenging for autonomous vehicles.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when building modeling of an autonomous vehicle, the system emulates the human thought process by perceiving a driving environment for the autonomous vehicle to understand the driving environment and make safe and appropriate decisions. For example, the system perceives or scans the driving environment to identify one or more vehicles nearby the autonomous vehicle. For each of the identified vehicle, the system obtains a current location of the identified vehicle. Using the current location, the system can obtain context information surrounding the identified vehicle. The context information can be factors in influencing the freedom of movement for the identified vehicle. The system provides the context information to a machine learning model, for example a recurrent neural network (RNN) model, for training and providing trajectory prediction results of the identified vehicle, thereby allowing the autonomous vehicle to make safe and appropriate driving decisions based on the prediction results.

In one embodiment, a surrounding environment of an autonomous vehicle is perceived to identify one or more vehicles nearby. For each of the identified vehicles, based on a current location of the identified vehicle, vehicle-independent information is obtained to determine context surrounding the identified vehicle, where the vehicle-independent information includes vehicle surrounding information that defines physical constraints imposed on the identified vehicle. One or more trajectories for the identified vehicle are predicted based at least in part on the vehicle-independent information associated with the identified vehicle. The autonomous vehicle is controlled based on the one or more predicted trajectories of the one or more identified vehicles.

Figure 1:
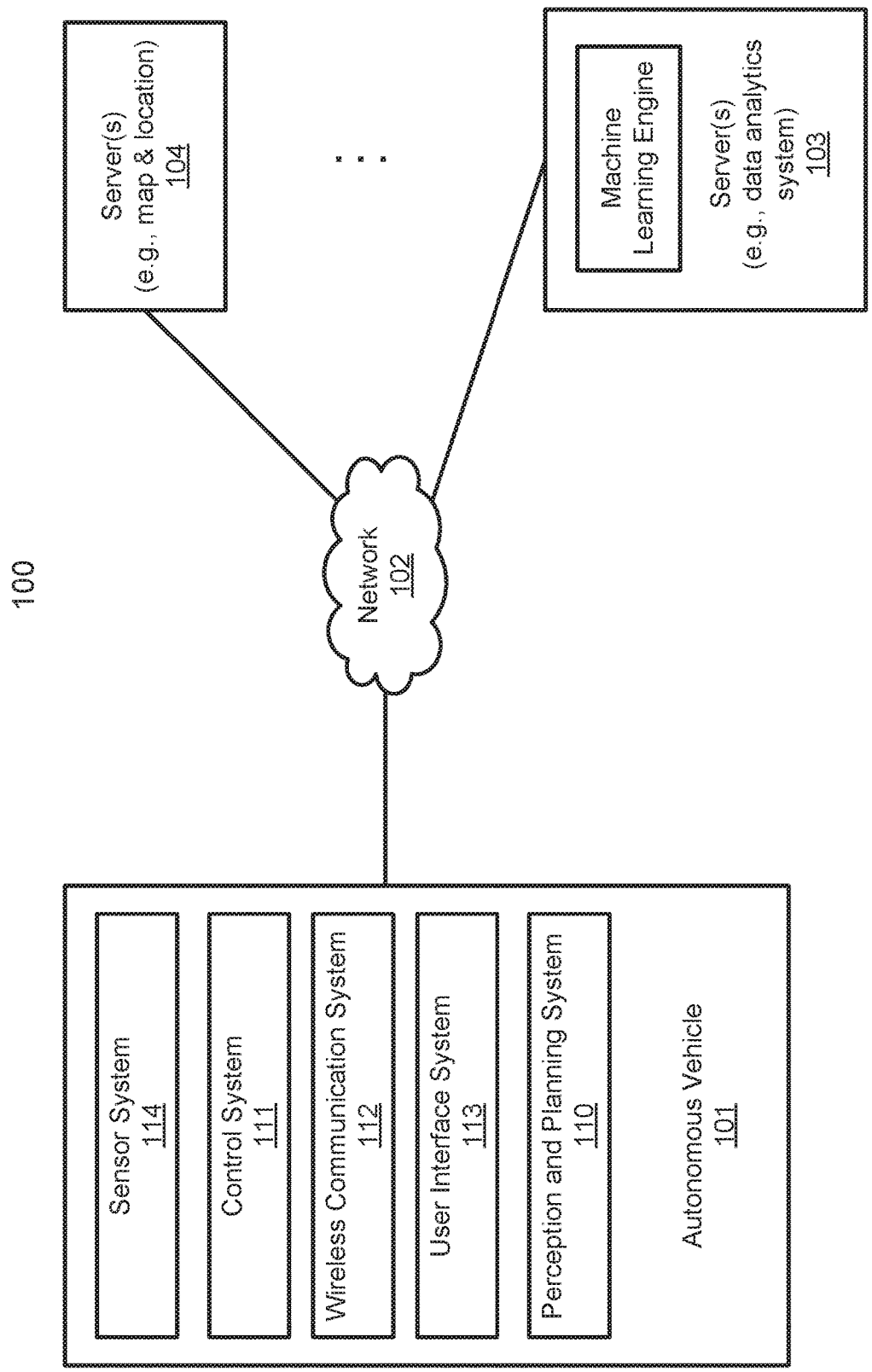
FIG. 1 is a block diagram illustrating a networked system according to one embodiment of the invention.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 114. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-114 may be communicatively coupled to each other via an interconnect, a bus, a network, or a combination thereof. For example, components 110-114 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
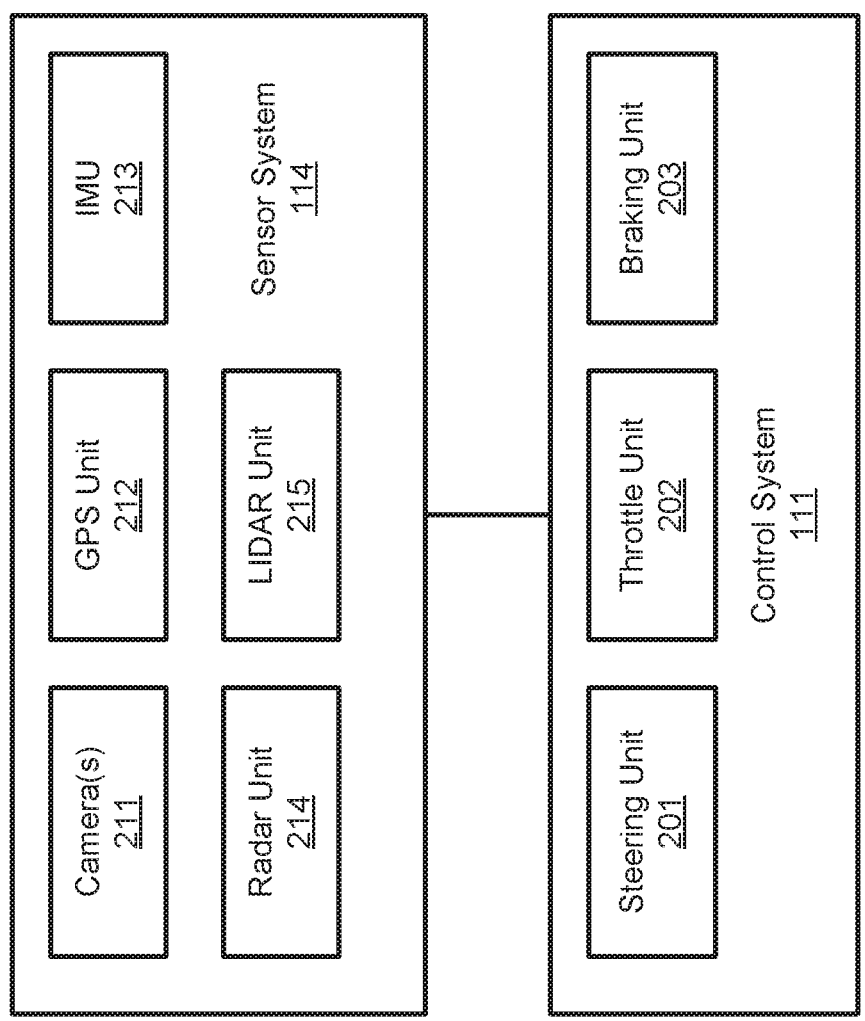
FIG. 2 is a block diagram illustrating an example of an autonomous vehicle according to one embodiment of the invention.

Referring now to FIG. 2, in one embodiment, sensor system 114 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 114 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 114, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 114 (e.g., obstacles, objects, nearby vehicles), perception and planning system 110 can plan an optimal route and drive vehicle 101, for example, via control system 111, according to the planned route to reach the specified destination safely and efficiently.

In one embodiment, in making safe and appropriate driving decisions, the autonomous vehicle 101 perceives a surrounding environment to identify one or more vehicles nearby. For each identified vehicle, based on a current location of the identified vehicle, the autonomous vehicle 101 obtains vehicle-independent information to determine context surrounding the identified vehicle, where the vehicle-independent information includes vehicle surrounding information that defines physical constraints imposed on the identified vehicle. Based at least in part on the vehicle-independent information associated with the identified vehicle, the autonomous vehicle 101 predicts one or more trajectories for the identified vehicle. The autonomous vehicle 101 then makes a maneuver based on the predicted trajectories for the identified vehicle.

In one embodiment, the vehicle-independent information further includes a time when the vehicle is identified, driving conditions, points of interest (POI) and event information, and traffic information that further impose the physical constraints on the vehicle. These factors may have an impact on how the vehicle may operate subsequently.

In one embodiment, the autonomous vehicle 101 predicts one or more trajectories for the identified vehicle based at least in part on the vehicle-independent information by invoking at least in part a machine learning model to generate or predict the one or more trajectories based on the vehicle-independent information.

For each of the identified vehicles, the autonomous vehicle 101 further obtains sensor data associated with the identified vehicle from one or more sensors of the autonomous vehicle 101, and determines the current location of the identified vehicle based at least in part on the sensor data.

Figure 3:
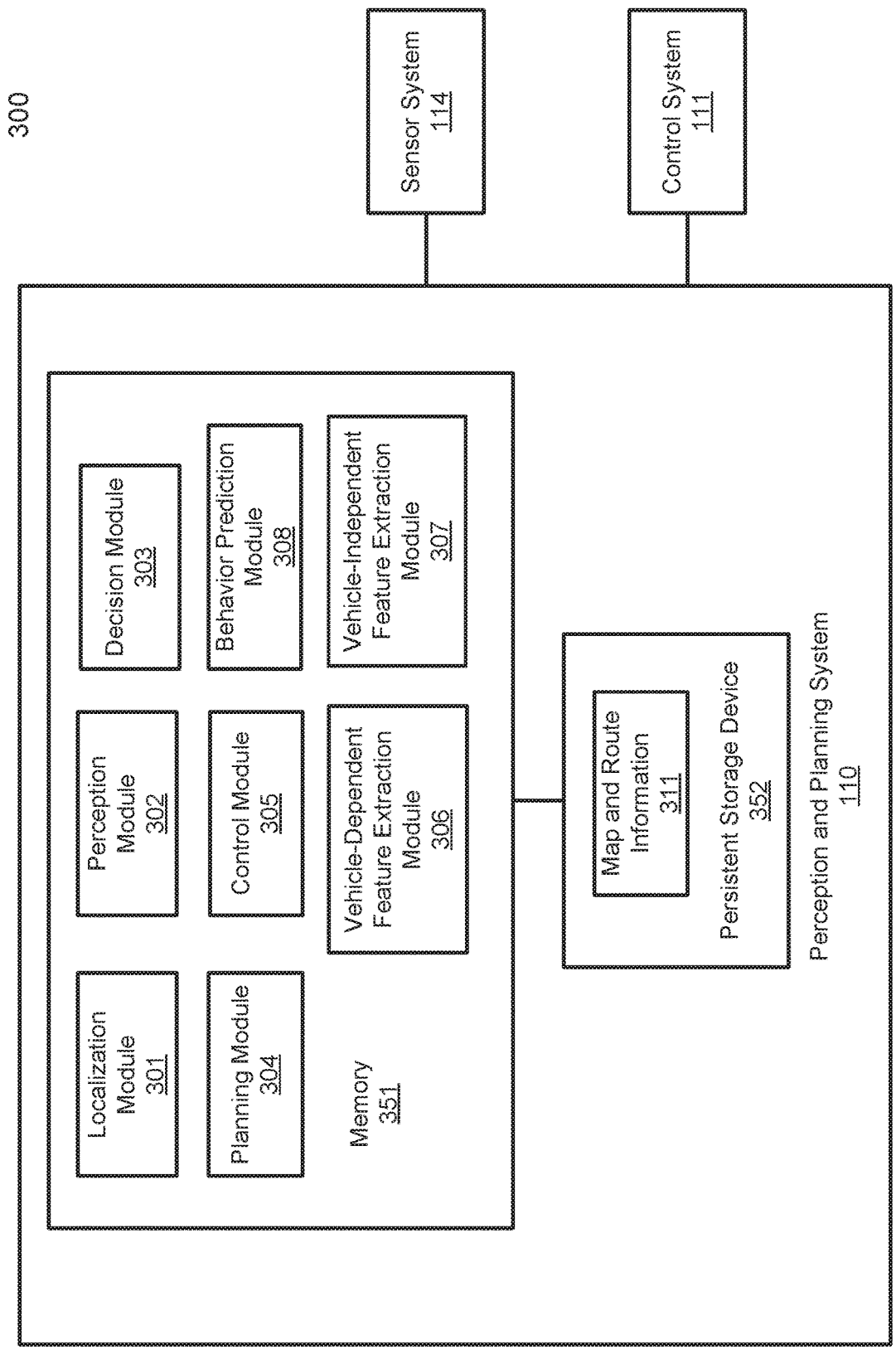
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 114. Referring to FIG. 3, perception and planning system 110 includes, but is not limited to, localization module 301, perception module 302, decision module 303, planning module 304, control module 305, vehicle-dependent feature extraction module 306, vehicle-independent feature extraction module 307, and behavior prediction module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 114 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Vehicle-dependent feature extraction module 306 obtains vehicle-dependent information or features (e.g., sensor data associated with another vehicle), and provides the vehicle-dependent information to the behavior prediction module 308. For example, the perception module 302 may perceive a surrounding environment of an autonomous vehicle (e.g., the autonomous vehicle 101) to detect or identify one or more vehicles nearby or within a predetermined proximity of the autonomous vehicle. When one or more nearby vehicles is/are identified and for each of the identified vehicles, the sensor system 114 (e.g., by way of the radar unit 214) may utilize radio signals to sense the identified vehicle and generate sensor data (e.g., speed, acceleration, heading, etc.) associated with the identified vehicle.

Additionally, for example, by leveraging on map and route information 311, MPOI information, location information, and/or the sensor data, a current location of the identified vehicle may be determined. The sensor data and the current location of the identified vehicle, for example, may be stored into a memory or storage of the perception and planning system 110 under, for example, a vehicle identifier (VID) generated and assigned to the identified vehicle by the perception and planning system 110. The vehicle-dependent feature extraction module 306, therefore, may obtain the sensor data by reading or retrieving the sensor data from the memory of the perception and planning system 110 and provide the sensor data to the behavior prediction module 308.

Based on the current location of the identified vehicle, vehicle-independent feature extraction module 307 may obtain vehicle-independent information or features (e.g., context-awareness features) to determine the context surrounding the identified vehicle. The context-awareness features may be categorized into different categories to cover the concept of "when, where, and who" and include information that defines various physical constraints imposed on the identified vehicle. For example, utilizing the perception module 302, the vehicle-independent feature extraction module 307 may determine a time (e.g., month, day of the week, hour, minute, second) when the vehicle is perceived and identified. Different dates in a month and different weekdays of a week may have different driving conditions (e.g., traffic congestion) that may impact how other drivers may operate their vehicles. Additionally, the vehicle-independent extraction module 307 may receive context-awareness features from a remote server (e.g., servers 103-104), the perception module 302 and/or the sensor system 114 such as driving condition information, vehicle surrounding information, points of interest (POI) and event information, and traffic information.

In some embodiments, the driving condition information is utilized to determine visibility, stability and drivability. Therefore, the driving condition information may include road unevenness, road width to vehicle width ratio, road curvature, rain level, fog level, snow level, temperature, and/or any information that affects the driving conditions of the identified vehicle.

In some embodiments, the vehicle surrounding information includes information indicative of the freedom of movement of a vehicle such as blocking area percentage, blocking obstacle type distribution (e.g., static obstacles, vehicles, bicycles, pedestrians, and/or other moving obstacles nearby the identified vehicle, and their directions relative to the identified vehicle), and relative congestion level.

In some embodiments, the POI and event information may also be utilized to determine the freedom of movement for the vehicle. That is, the POI and event information may describe the surrounding of a destination for a vehicle. For example, a particular point of interest (e.g., an attraction) may represent a destination heading for a vehicle (e.g., the identified vehicle). If, for example, an event (e.g., a concert) occurs at such point of interest during a specific date and time of the week, it can be expected that a crowd would gather for such event during the specific date and time. Therefore, the freedom of movement for a vehicle may be impacted when the vehicle is within proximity of the point of interest (i.e., its destination) during the specific date and time. Accordingly, in some embodiments, the POI and event information may include distribution data of nearby POI type, distribution data of event type, event popularity information, and event popularity history.

In some embodiments, the traffic information may include traffic historical data of a specific time and destination. As an example, an average traffic historical data distribution of four previous days in the week during the same hour can be factors in predicting the traffic condition for today. Moreover, accident history nearby a certain destination, for example, may also be a factor in predicting the likelihood that an accident will occur at such destination today.

Based on the vehicle-independent and/or vehicle-dependent information, the behavior prediction module 308 predicts one or more trajectories for the identified vehicle, and provides the predicted trajectories to decision module 303 and/or planning module 304. For example, the behavior prediction module 308 may invoke one or more machine learning models or algorithms, for example recurrent neural network (RNN) model, to learn from and make prediction on data provided by the vehicle-independent and/or vehicle-dependent information, thereby training the model(s) to predict one or more trajectories of the identified vehicle on a training set of vehicle-independent and/or vehicle-dependent information.

Figure 4:
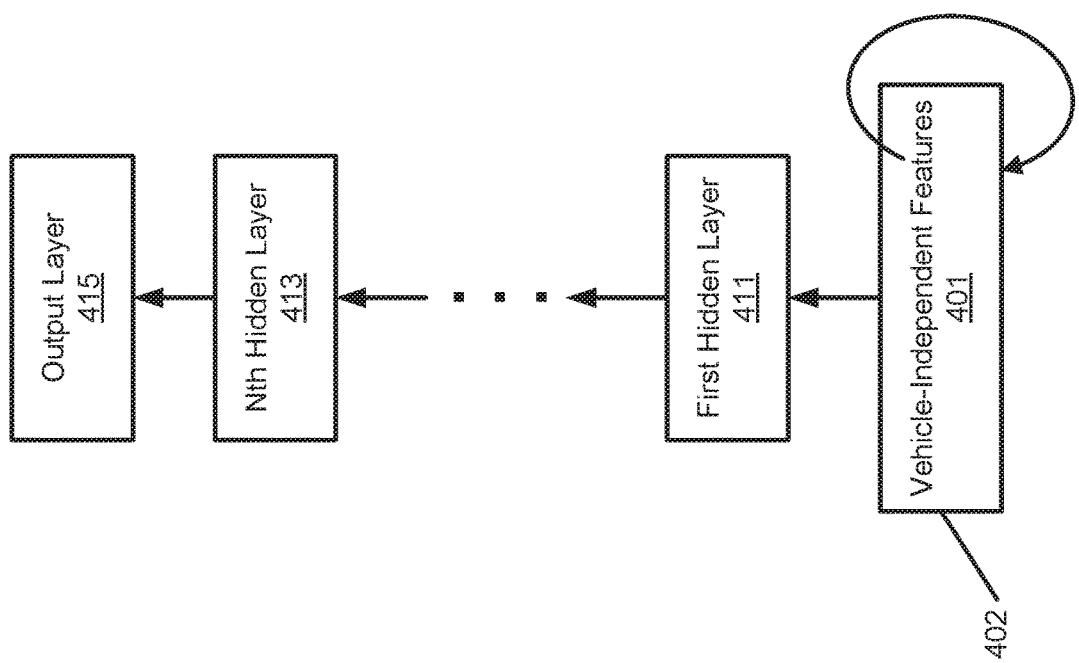
FIG. 4 is a diagram illustrating an example of a machine learning model according to one embodiment of the invention.

FIG. 4 is a diagram illustrating an example of a machine learning model according to one embodiment of the invention. In some embodiments, machine learning model 400 may be invoked by the behavior prediction module 308 of FIG. 3. Referring to FIG. 4, the machine learning model includes an input layer 402, hidden layers 411-413, and an output layer 415, for example, as a part of an RNN model. An RNN model is a class of artificial neural networks where connections between units form a directed cycle. This creates an internal state of the network which allows it to exhibit dynamic temporal behavior. RNNs can use their internal memory to process arbitrary sequences of inputs.

As shown in FIG. 4, vehicle-independent features 401 are provided to the input layer 402 in a recurring manner. The input layer 402 may include input nodes or neurons that receive the vehicle-independent features 401 (e.g., a time when a vehicle is perceived and identified, driving condition information, vehicle surrounding information, POI and event information, and traffic information), and communicate the vehicle-independent features 401 to first hidden layer 411, which may include interneurons, for processing. In some embodiments, the input layer 402 may convert or encode the vehicle-independent features 401 into a convenient form prior to communicating the information to the first hidden layer 411. In some embodiments, the first hidden layer 411 may invoke a supervised learning rule that uses the vehicle-independent features 401 as a training set. In some embodiments, the first hidden layer 411 may, instead of or in addition to the supervised learning rule, invoke an unsupervised learning rule (e.g., delta rule) that modifies or updates weights of the connections between the input layer 402 and the first hidden layer 411 in accordance with the provided vehicle-independent features 401.

Output data from the first hidden layer 411 may be provided to a next hidden layer, for example Nth hidden layer 413, with N being a number of hidden layers in the machine learning model 400, for further processing. The Nth hidden layer 413 may include interneurons that communicate with the interneurons from the first hidden layer 411. As with the first hidden layer 411, in some embodiments, the Nth hidden layer 413 may also invoke a supervised and/or unsupervised learning rule for processing the data from the first hidden layer 411. Upon processing the data, output data from the Nth hidden layer 413 may be provided to output layer 415, with the output data from the Nth hidden layer 413 representing one or more predicted trajectories of a vehicle. In some embodiments, the output layer 415 may include output nodes or neurons that receive the output data from the Nth hidden layer 413 and communicate the data to, for example, the decision module 303 and/or planning module 304.

Figure 5:
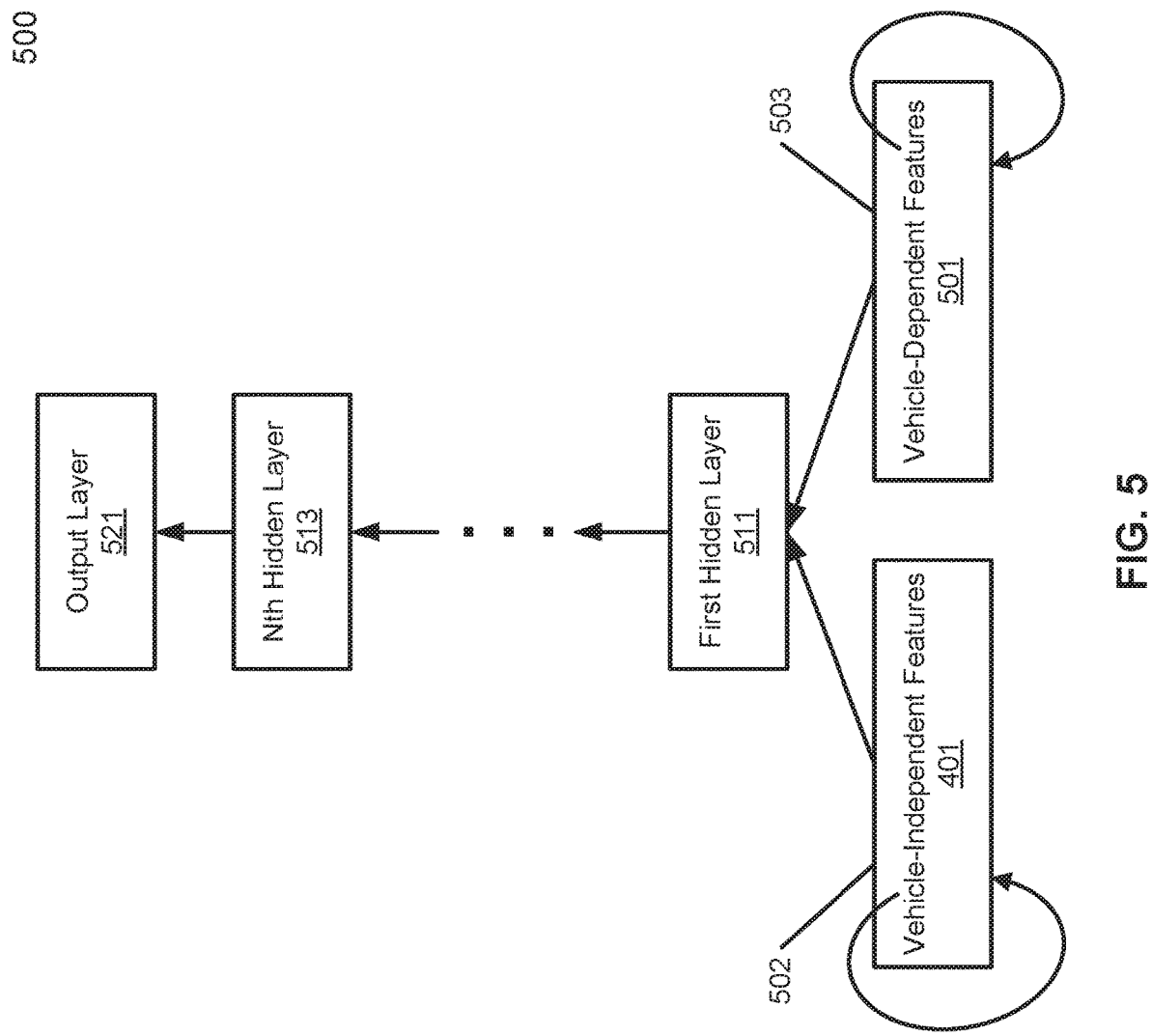
FIG. 5 is a diagram illustrating an example of a further machine learning model according to one embodiment of the invention.

FIG. 5 is a diagram illustrating an example of a further machine learning model according to one embodiment of the invention. In some embodiments, machine learning model 500 may be invoked by the behavior prediction module 308 of FIG. 3. Referring to FIG. 5, the machine learning model includes a first input layer 502, a second input layer 503, hidden layers 511-513, and an output layer 521. As shown in FIG. 5, vehicle-independent features 401 are provided to the first input layer 502 and vehicle-dependent features (e.g., sensor data and a current location associated with a vehicle) are provided to the second input layer 503 in a recurring manner, respectively. The first input layer 502 may include a first set of input neurons (not shown) that receive the vehicle-independent features 401 while the second input layer 503 may include a second set of input neurons (also not shown) that may receive the vehicle-dependent features 501, with the first and second sets of input neurons providing the vehicle-independent features 401 and the vehicle-dependent features 501 to the first hidden layer 511. The first hidden layer 511 may process the data or information from the vehicle-independent features 401 and the vehicle-dependent features 501 by way of invoking supervised and/or unsupervised learning rules. Subsequently, the processed data are communicated to a next hidden layer (e.g., the Nth hidden layer 513, with N being a number of hidden layers in the machine learning model 500). The Nth hidden layer 513 may also invoke supervised and/or unsupervised learning rules to further process the data, and communicate output data representing one or more predicted trajectories of a vehicle to the output layer 521.

Figure 6:
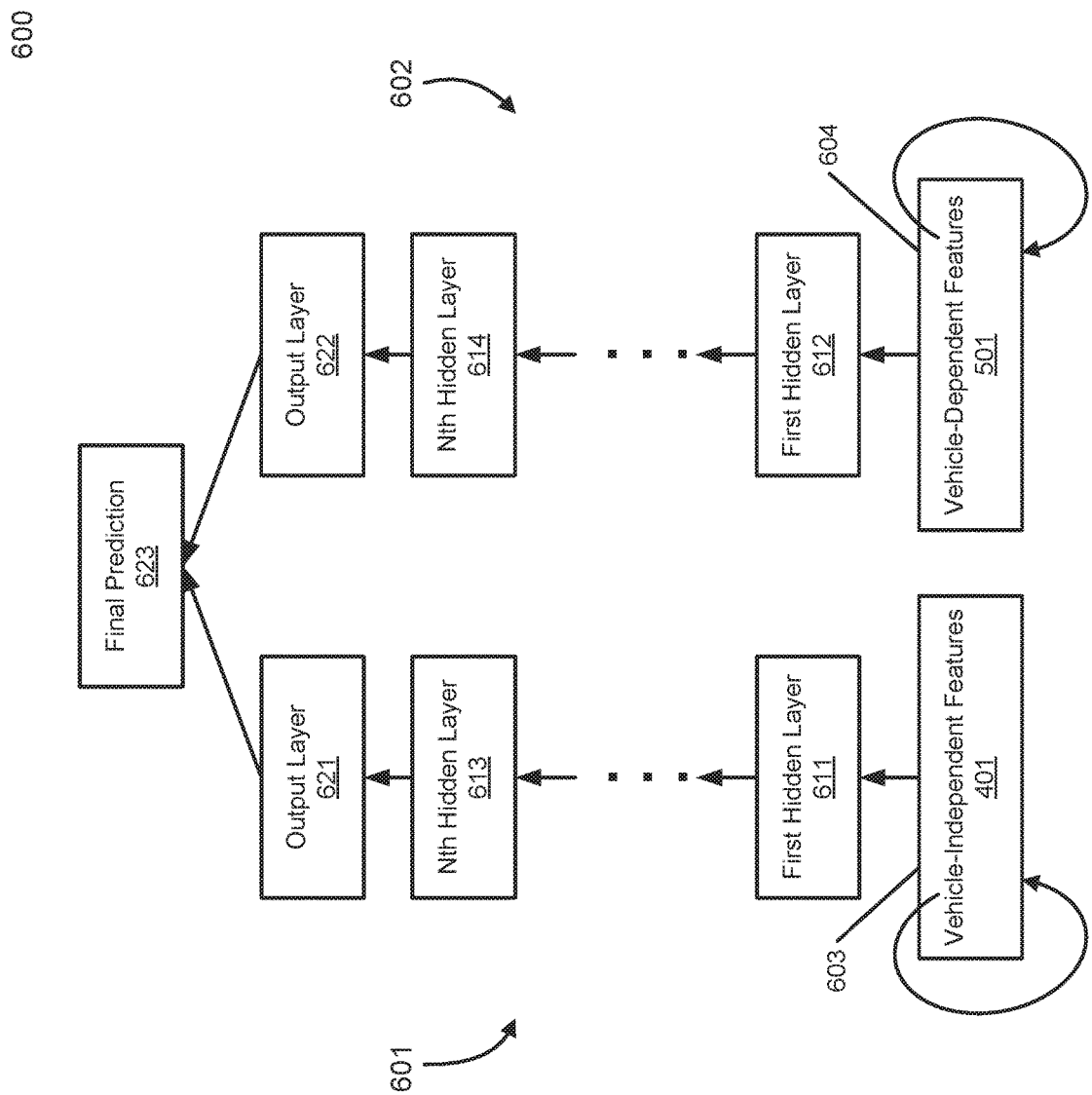
FIG. 6 is a diagram illustrating an example of a further machine learning model according to one embodiment of the invention.

FIG. 6 is a diagram illustrating an example of a further machine learning model according to one embodiment of the invention. In some embodiments, machine learning model 600 may be invoked by the behavior prediction module 308 of FIG. 3. Referring to FIG. 6, vehicle-independent features 401 and vehicle-dependent features 501 are provided in parallel to a first learning model 601 and a second learning model 602 respectively, with results or output information from the first learning model 601 and the second learning model 602 being combined or merged into final prediction 623. In some embodiments, the first learning model 601 and second learning model 602 are similar to or same as the machine learning model 400 of FIG. 4 and/or machine learning model 500 of FIG. 5.

Referring to FIG. 6, the vehicle-independent features 401 are provided to an input layer 603 in a recurring fashion. Subsequently, the input layer 603 communicates information from the vehicle-independent features 401 to a first hidden layer 611. Upon processing the information (e.g., using supervised and/or unsupervised learning rules), the first hidden layer 611 may communicate or provide the processed information to a subsequent hidden layer (e.g., Nth hidden layer 613, where N is a number of hidden layers in the first learning model 601) for additional processing, with output information from the Nth hidden layer 613 being provided to an output layer 621.

Similarly, still referring to FIG. 6, the vehicle-dependent features 501 are also provided to an input layer 604 in a recurring fashion. The input layer 604 then communicates information from the vehicle-dependent features 501 to a first hidden layer 612 for processing. Subsequent to processing the information, the first hidden layer 612 may communicate the processed information to a subsequent layer (e.g., Nth hidden layer 614, where N is a number of hidden layers in the second learning model 602) for additional processing, with output information from the Nth hidden layer 614 being provided to an output layer 622. Output information from the output layer 621 and output layer 622 are combined or merged (e.g., using Bayesian algorithm, decision tree and/or multiplication) into final prediction 623, with the final prediction 623 indicating one or more final predicted trajectories of a vehicle.

Figure 7:
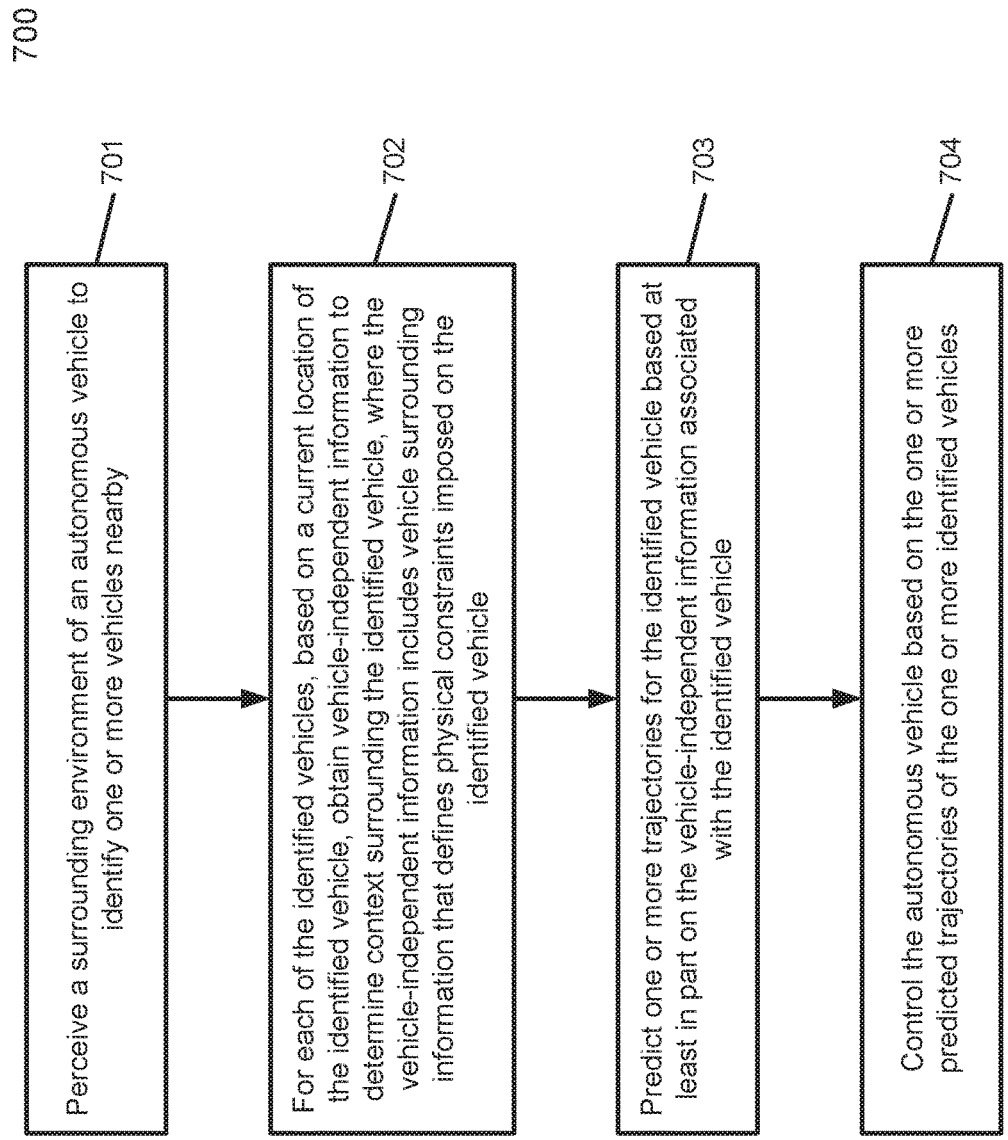
FIG. 7 is a flow diagram illustrating a process of operating an autonomous vehicle according to one embodiment of the invention.

FIG. 7 is a flow diagram illustrating a process of operating an autonomous vehicle according to one embodiment of the invention. Process 700 may be performed by processing logic which may include software, hardware, or a combination thereof. For example, process 700 may be performed by the perception and planning system 110 of FIG. 1. Referring to FIG. 7, at block 701, the processing logic perceives a surrounding environment of an autonomous vehicle to identify one or more vehicles nearby. At block 702, for each of the identified vehicles, based on a current location of the identified vehicle, the processing logic obtains vehicle-independent information to determine context surrounding the identified vehicle, where the vehicle-independent information includes vehicle surrounding information that defines physical constraints imposed on the identified vehicle. At block 703, the processing logic predicts one or more trajectories for the identified vehicle based at least in part on the vehicle-independent information associated with the identified vehicle. At block 704, the processing logic controls the autonomous vehicle based on one or more predicted trajectories of one or more identified vehicles.

Figure 8:
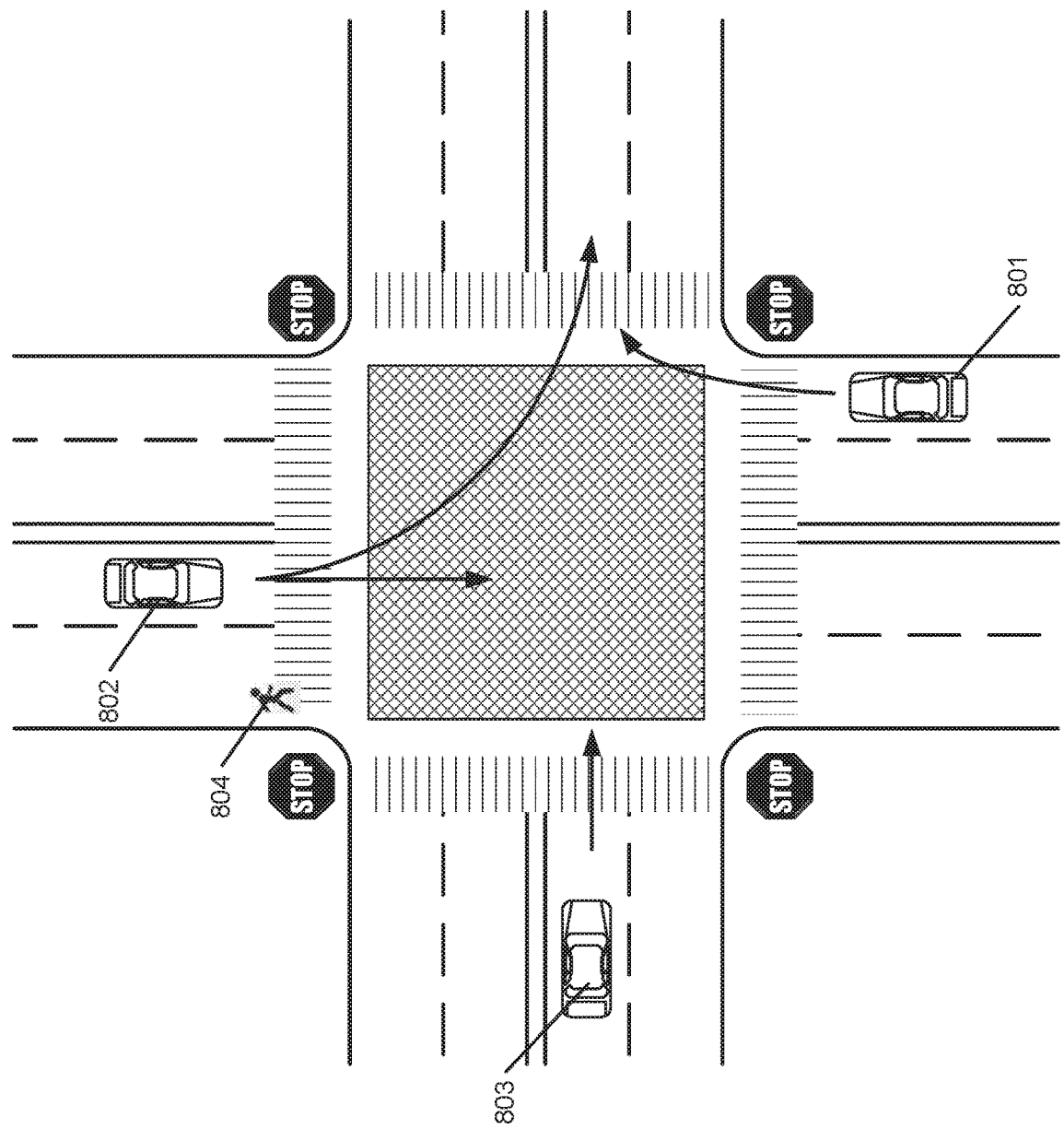
FIG. 8 illustrates an example of a driving scenario according to one embodiment of the invention.

FIG. 8 illustrates an example of a driving scenario according to one embodiment of the invention. Referring to FIG. 8, in this example, a first vehicle 801 (e.g., autonomous vehicle 101), which may be referred to as "master vehicle," a second vehicle 802, and a third vehicle 803 may arrive at a stop sign intersection at or approximately the same time, with the second vehicle 802 and third vehicle 803 potentially travelling in trajectories intervening with a planned trajectory of the master vehicle. Subsequently, the master vehicle may perceive a surrounding environment within the stop sign intersection (e.g., by invoking the perception module 302) to identify one or more vehicles nearby. In this case, the master vehicle would identify the second vehicle 802 and the third vehicle 803. For each of the identified vehicles (i.e., the second vehicle 802 and third vehicle 803), the master vehicle obtains a current location of the identified vehicle (e.g., by invoking at least in part the localization module 301). Using the current location, the master vehicle may obtain vehicle-independent information or features (e.g., surround information) for the identified vehicle (e.g., by invoking the vehicle-independent feature extraction module 307). In this scenario, the master vehicle would not detect any obstacles surrounding the third vehicle 803. However, the master vehicle, by invoking the perception module 302 and/or leveraging sensor data from the sensor system 114, would detect a pedestrian 804 intervening the trajectory of the second vehicle 802. As the third vehicle 803 does not have obstacles intervening its path, the master vehicle may predict that the third vehicle 803 will perform an overtake maneuver. Therefore, the master vehicle, for example, may yield to the third vehicle 803. On the other hand, as the second vehicle 802 may require to wait on the pedestrian 804 to cross, the second vehicle 802 may not be able to maneuver for a period of time. The master vehicle, therefore, may make prediction that the second vehicle 802 will yield, and overtake the second vehicle 802.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
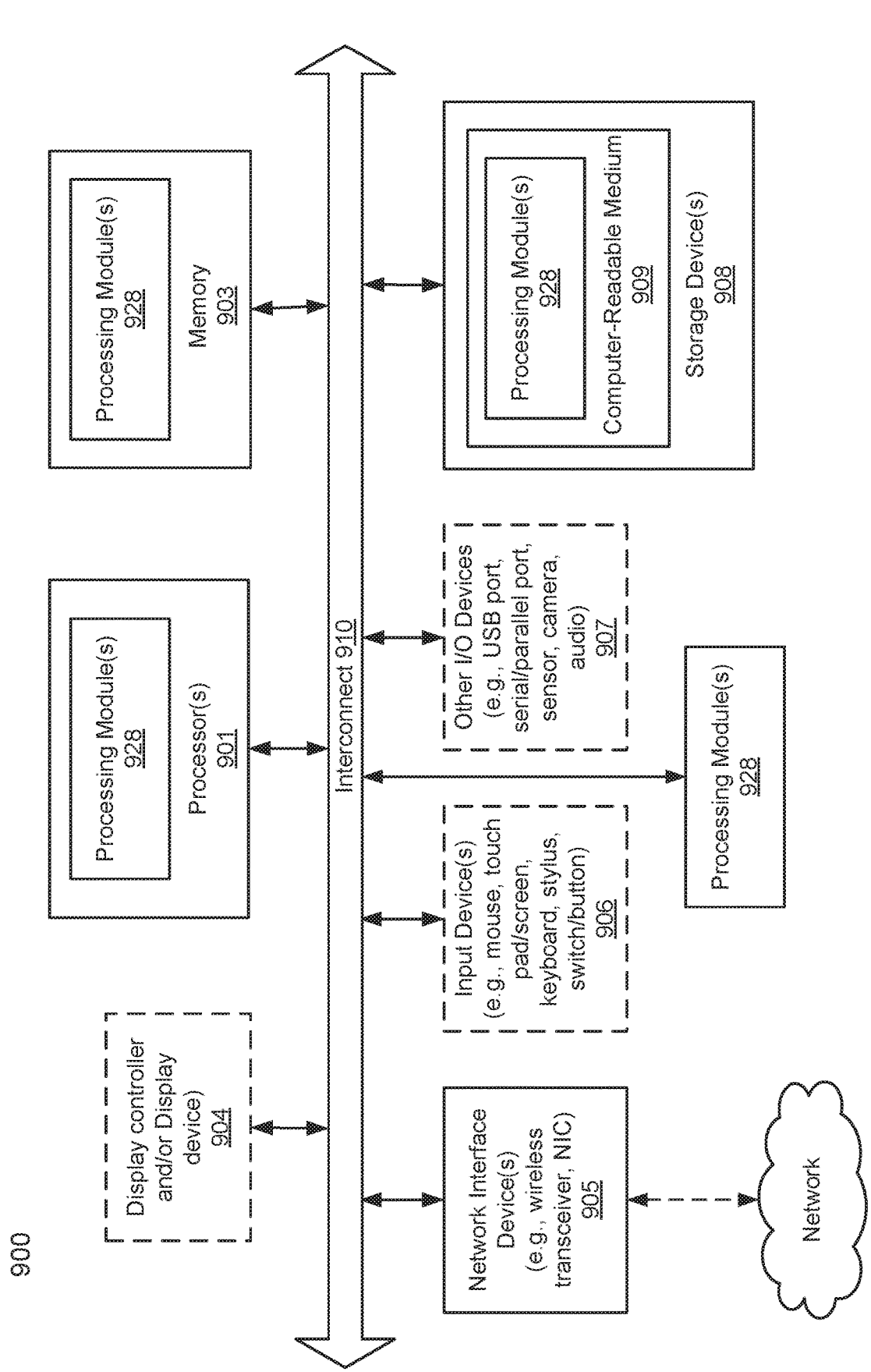
FIG. 9 is a block diagram illustrating a data processing system according to one embodiment.

FIG. 9 is a block diagram illustrating an example of a data processing system which may be used with one embodiment of the invention. For example, system 900 may represent any of data processing systems described above performing any of the processes or methods described above, such as, for example, perception and planning system 110 or any of servers 103-104 of FIG. 1. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Robot Operating System (ROS), Windows® operating system from Microsoft®, Mac OS®/iOS® from Apple, Android from Google®, LINUX, UNIX, or other real-time or embedded operating systems.

System 900 may further include IO devices such as devices 905-908, including network interface device(s) 905, optional input device(s) 906, and other optional IO device(s) 907. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of touch sensitivity technologies, including but not limited to capacitive, resistive, infrared, and surface acoustic wave technologies, as well as other proximity sensor arrays or other elements for determining one or more points of contact with the touch screen.

IO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including BIOS as well as other firmware of the system.

Storage device 908 may include computer-accessible storage medium 909 (also known as a machine-readable storage medium or a computer-readable medium) on which is stored one or more sets of instructions or software (e.g., module, unit, and/or logic 928) embodying any one or more of the methodologies or functions described herein. Processing module/unit/logic 928 may represent any of the components described above, such as, for example, planning module 304, control module 305, or any of the modules 306-308 (alone or in combination). Processing module/unit/logic 928 may also reside, completely or at least partially, within memory 903 and/or within processor 901 during execution thereof by data processing system 900, memory 903 and processor 901 also constituting machine-accessible storage media. Processing module/unit/logic 928 may further be transmitted or received over a network via network interface device 905.

Computer-readable storage medium 909 may also be used to store the some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 928, components and other features described herein can be implemented as discrete hardware components or integrated in the functionality of hardware components such as ASICS, FPGAs, DSPs or similar devices. In addition, processing module/unit/logic 928 can be implemented as firmware or functional circuitry within hardware devices. Further, processing module/unit/logic 928 can be implemented in any combination hardware devices and software components.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
perceiving a surrounding environment of the autonomous vehicle to identify one or more vehicles nearby;
for each of the identified vehicles,
obtaining a first set of features for the identified vehicle extracted from vehicle-independent information associated with the identified vehicle, the vehicle-independent information including physical constraints imposed on the identified vehicle,
providing the first set of features to a first set of neurons in a first input layer of a recurrent neural network (RNN) machine learning model and communicating the first set of features, by the first input layer, to a first set of hidden layers of the RNN machine learning model, wherein the first input layer encodes the first set of features prior to communicating the first set of features to the first set of hidden layers,
obtaining a second set of features extracted from sensor data captured by one or more sensors of the autonomous vehicle perceiving behaviors of the identified vehicle, the second set of features comprising vehicle-dependent features, including a speed, an acceleration, and a heading of the identified vehicle,
providing the second set of features to a second set of neurons in a second input layer of the RNN machine learning model, and communicating the second set of features, by the second input layer, to a second set of hidden layers of the RNN machine learning model,
further processing the first set of features by the first set of hidden layers and separately processing the second set of features by the second set of hidden layers, and subsequently processing the processed first and second set of features by combining respective output from the first and the second sets of hidden layers, and
predicting, via an output layer of the machine learning model, one or more trajectories for the identified vehicle by applying a machine learning model to the first set and the second set of features for the identified vehicle; and
controlling the autonomous vehicle based on the one or more predicted trajectories of the one or more identified vehicles.

2. The method of claim 1, further comprising, for each of the identified vehicles, determining a current location of the identified vehicle based at least in part on the sensor data.

3. The method of claim 1, wherein the vehicle-independent information further includes a date and a time when the vehicle is identified, and at least one of: driving conditions, points of interest (POI) and event information, and traffic information is determined based upon the date and time and imposes the physical constraints on the vehicle.

4. The method of claim 3, wherein the POI and event information includes information representing a destination heading for the identified vehicle, and wherein the at least one of: the driving conditions, the POI and event information, and the traffic information at the date and time when the vehicle is identified is determined by accessing a remote server.

5. The method of claim 1, wherein predicting one or more trajectories for the identified vehicle by applying the machine learning model to the first and the second set of features includes invoking the machine learning model to output the one or more trajectories based on the vehicle-independent information and the vehicle-dependent features.

6. The method of claim 1, wherein the first set of hidden layers includes interneurons that receive the encoded first set of features communicated to the first set of hidden layers.

7. The method of claim 1, wherein the vehicle-independent information is provided to the first input layer of the RNN machine learning model in a recurring manner and the vehicle-dependent features are provided to the second input layer of the RNN machine learning model in a recurring manner.

8. A non-transitory machine-readable medium having instructions stored therein, which when executed by a processor, cause the processor to perform operations of operating an autonomous vehicle, the operations comprising:
perceiving a surrounding environment of the autonomous vehicle to identify one or more vehicles nearby;
for each of the identified vehicles,
obtaining a first set of features for the identified vehicle extracted from vehicle-independent information associated with the identified vehicle, the vehicle-independent information including physical constraints imposed on the identified vehicle,
providing the first set of features to a first set of neurons in a first input layer of a recurrent neural network (RNN) machine learning model and communicating the first set of features, by the first input layer, to a first set of hidden layers of the RNN machine learning model, wherein the first input layer encodes the first set of features prior to communicating the first set of features to the first set of hidden layers,
obtaining a second set of features extracted from sensor data captured by one or more sensors of the autonomous vehicle perceiving behaviors of the identified vehicle, the second set of features comprising vehicle-dependent features of the identified vehicle, including a speed, an acceleration, and a heading of the identified vehicle,
providing the second set of features to a second set of neurons in a second input layer of the RNN machine learning model, and communicating the second set of features, by the second input layer, to a second set of hidden layers of the RNN machine learning model,
further processing the first set of features by the first set of hidden layers and separately processing the second set of features by the second set of hidden layers, and subsequently processing the processed first and second set of features by combining respective output from the first and the second sets of hidden layers, and
predicting, via an output layer of the machine learning model, one or more trajectories for the identified vehicle by applying a machine learning model to the first set and the second set of features for the identified vehicle; and
controlling the autonomous vehicle based on the one or more predicted trajectories of the one or more identified vehicles.

9. The machine-readable medium of claim 8, wherein the operations further comprise, for each of the identified vehicles, determining a current location of the identified vehicle based at least in part on the sensor data.

10. The machine-readable medium of claim 8, wherein the vehicle-independent information further includes a date and a time when the vehicle is identified, and at least one of: driving conditions, points of interest (POI) and event information, and traffic information is determined based upon the date and time and imposes the physical constraints on the vehicle.

11. The machine-readable medium of claim 10, wherein the POI and event information includes information representing a destination heading for the identified vehicle, and wherein the at least one of: the driving conditions, the POI and event information, and the traffic information at the date and time when the vehicle is identified is determined by accessing a remote server.

12. The machine-readable medium of claim 8, wherein predicting one or more trajectories for the identified vehicle by applying the RNN machine learning model to the first and the second set of features includes invoking the RNN machine learning model to output the one or more trajectories based on the vehicle-independent information and the vehicle-dependent features.

13. The machine-readable medium of claim 8, wherein the first set of hidden layers includes interneurons that receive the encoded first set of features communicated to the first set of hidden layers.

14. The machine-readable medium of claim 8, wherein the vehicle-independent information is provided to the first input layer of the RNN machine learning model in a recurring manner and the vehicle-dependent features are provided to the second input layer of the RNN machine learning model in a recurring manner.

15. A data processing system, comprising:
a processor; and
a memory coupled to the processor to store instructions, which when executed by the processor, cause the processor to perform operations, the operations including
perceiving a surrounding environment of an autonomous vehicle to identify one or more vehicles nearby,
for each of the identified vehicles,
obtaining a first set of features for the identified vehicle extracted from vehicle-independent information associated with the identified vehicle, the vehicle-independent information including physical constraints imposed on the identified vehicle,
providing the first set of features to a first set of neurons in a first input layer of a recurrent neural network (RNN) machine learning model and communicating the first set of features, by the first input layer, to a first set of hidden layers of the RNN machine learning model, wherein the first input layer encodes the first set of features prior to communicating the first set of features to the first set of hidden layers,
obtaining a second set of features extracted from sensor data captured by one or more sensors of the autonomous vehicle perceiving behaviors of the identified vehicle, the second set of features comprising vehicle-dependent features of the identified vehicle, including a speed, an acceleration, and a heading of the identified vehicle,
providing the second set of features to a second set of neurons in a second input layer of the RNN machine learning model, and communicating the second set of features, by the second input layer, to a second set of hidden layers of the RNN machine learning model via interneurons that receive the processed second set of features,
further processing the first set of features by the first set of hidden layers and separately processing the second set of features by the second set of hidden layers, and subsequently processing the processed first and second set of features by combining respective output from the first and the second sets of hidden layers, and predicting, via an output of the RNN machine learning model, one or more trajectories for the identified vehicle by applying a machine learning model to the first set and the second set of features for the identified vehicle; and controlling the autonomous vehicle based on the one or more predicted trajectories of the one or more identified vehicles.

16. The system of claim 15, wherein the operations further comprise, for each of the identified vehicles, determining a current location of the identified vehicle based at least in part on the sensor data.

17. The system of claim 15, wherein the vehicle-independent information further includes a date and a time when the vehicle is identified, and at least one of: driving conditions, points of interest (POI) and event information, and traffic information is determined based upon the date and time and imposes the physical constraints on the vehicle.

18. The system of claim 17, wherein the POI and event information includes information representing a destination heading for the identified vehicle, and the at least one of: the driving conditions, the POI and event information, and the traffic information at the date and time when the vehicle is identified is determined by accessing a remote server.

19. The system of claim 15, wherein predicting one or more trajectories for the identified vehicle by applying the RNN machine learning model to the first and the second set of features includes invoking the RNN machine learning model to output the one or more trajectories based on the vehicle-independent information and the vehicle-dependent features.

20. The system of claim 15, wherein the first set of hidden layers includes interneurons that receive the encoded first set of features communicated to the first set of hidden layers.

21. The system of claim 15, wherein the vehicle-independent information is provided to the first input layer of the RNN machine learning model in a recurring manner and the vehicle-dependent features are provided to the second input layer of the RNN machine learning model in a recurring manner.

* * * * *